United States Patent [19]

Kadono

[11] Patent Number: 5,127,095
[45] Date of Patent: Jun. 30, 1992

[54] ADDRESSING SYSTEM FOR A MEMORY UNIT

[75] Inventor: Takashi Kadono, Osaka, Japan

[73] Assignee: Minolta Camera Kabushiki Kaisha, Osaka, Japan

[21] Appl. No.: 193,270

[22] Filed: May 11, 1988

[30] Foreign Application Priority Data

May 14, 1987 [JP] Japan .................. 62-117941

[51] Int. Cl.⁵ .................. G06F 13/00; G06F 3/00
[52] U.S. Cl. .................. 395/425; 395/500; 395/550; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,050,058 | 9/1977 | Garlic | 364/200 |
| 4,112,480 | 9/1978 | Pohlman et al. | 364/200 |
| 4,144,562 | 3/1979 | Cooper | 364/200 |
| 4,213,177 | 7/1980 | Schmidt | 364/200 |
| 4,232,366 | 11/1980 | Levy et al. | 364/200 |
| 4,345,244 | 8/1982 | Greer et al. | |
| 4,467,447 | 8/1984 | Takahashi et al. | 364/900 |
| 4,559,615 | 12/1985 | Goo et al. | |
| 4,613,943 | 9/1986 | Parker | |
| 4,622,546 | 11/1986 | Sfarti et al. | |
| 4,626,985 | 12/1986 | Briggs | 364/200 |
| 4,675,808 | 6/1987 | Grinn et al. | 364/200 |
| 4,675,830 | 1/1987 | Hawkins | |
| 4,698,749 | 10/1987 | Bhadriraju | 364/200 |
| 4,805,092 | 2/1989 | Cerutti | 364/200 |
| 4,849,875 | 7/1989 | Fairman et al. | 364/200 |
| 4,868,784 | 9/1989 | Marshall et al. | 364/900 |
| 4,882,702 | 11/1989 | Struger et al. | 364/900 |

Primary Examiner—Alyssa H. Bowler
Assistant Examiner—Michael A. Whitfield
Attorney, Agent, or Firm—Price, Gess & Ubell

[57] ABSTRACT

In a system including a main body for processing data and a memory detachably provided to the main body, an addressing method for addressing the memory to write data therein or to read data therefrom being that plural bits of an address to be applied to the memory from the main body are divided into two parts, one part of address bits is transmitted to the memory through an address line provided for addressing the memory while another part of address bits is transmitted to the memory through a data line provided for communicating data between the main body and the memory, and two parts of address bits are joined in the memory to access the memory by full bits of the address.

2 Claims, 2 Drawing Sheets

ADDRESSING SYSTEM FOR A MEMORY UNIT

BACKGROUND OF THE INVENTION

1. Field of the Invention

The present invention relates to an addressing method for a memory unit, and more particularly to an addressing method capable of increasing addresses with an increased memory capacity.

2. Description of the Prior Arts

Computer systems have been employed wherein a memory which stores specified programs and data is detachably provided to a machine main body as a memory unit so as to cope with various applications. For example, in a character image generating circuit of a laser printer, a font ROM for converting character data sent from a host computer into images is constructed as memory; unit (font cartridge) for every style or size of characters so as it to be capable of mounting to the machine main body if need be. However, the memory capacity of the memory unit has markedly increased with the high demand for such a system and remarkable progress of semiconductive memory technology. As a result, the number of available bits has increased for designating an address of the memory, frequently causing deficiency in the number of signal lines between the machine main body and the memory unit. However, simply providing an increased number of signal lines will only give rise to an increased number of connectors, entailing a problem in that there is no replaceability between machines of conventional type and those of a new type.

SUMMARY OF THE INVENTION

A main object of the present invention is to provide an addressing method for a memory unit capable of increasing available addresses while maintaining replacability between machines of a convenional type and those of a new type.

These and other objects are accomplished by transmitting one part of the address bits to a memory through a data line provided for data communication.

These and other objects, advantages and features of the invention will become apparent from the following description thereof taken in conjunction with the accompanying drawings which illustrate a specific embodiment of the invention.

DETAILED DESCRIPTION OF THE PREFERRED EMBODIMENTS

An embodiment of the present invention will be explained hereinbelow with reference to the drawings.

Figure 1:
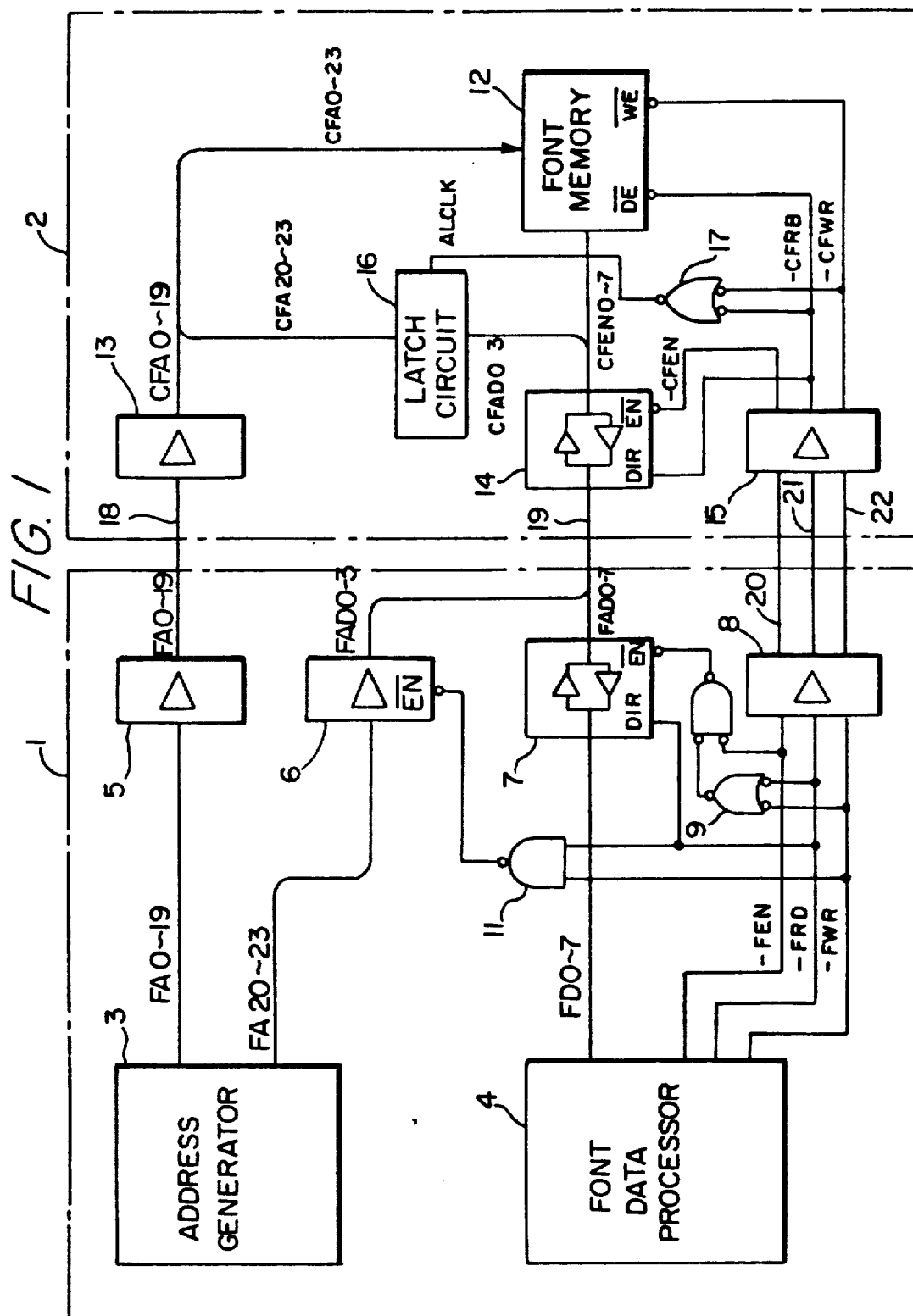
FIG. 1 is a block diagram showing a circuit of a machine main body and font cartridge by an addressing method according to the present invention.

FIG. 1 is a block diagram showing an essential part of a laser printer main body 1 and a font cartridge 2 detachably mounted to the machine main body 1. The machine main body 1 and the font cartridge 2 are electrically interconnected by a connector for a print substrate or a multipolar connector.

The machine main body 1 includes a font address generating portion 3 which generates address signals FA0 to FA23 for accessing the font cartridge 2 and a font data processing portion 4 for processing data read out from the font cartridge 2 or data to be written into the font cartridge 2. Of the address signals FA0 to FA23 generated from the font address generating portion 3, the low-order address signals FA0 to FA19 are outputted to an address line 18 through a bus buffer 5 and the remaining high-order address signals FA20 to FA23 are outputted to address data signal lines FAD0 to FAD3 (a data line 19) through a bus buffer 6.

Figure 2:
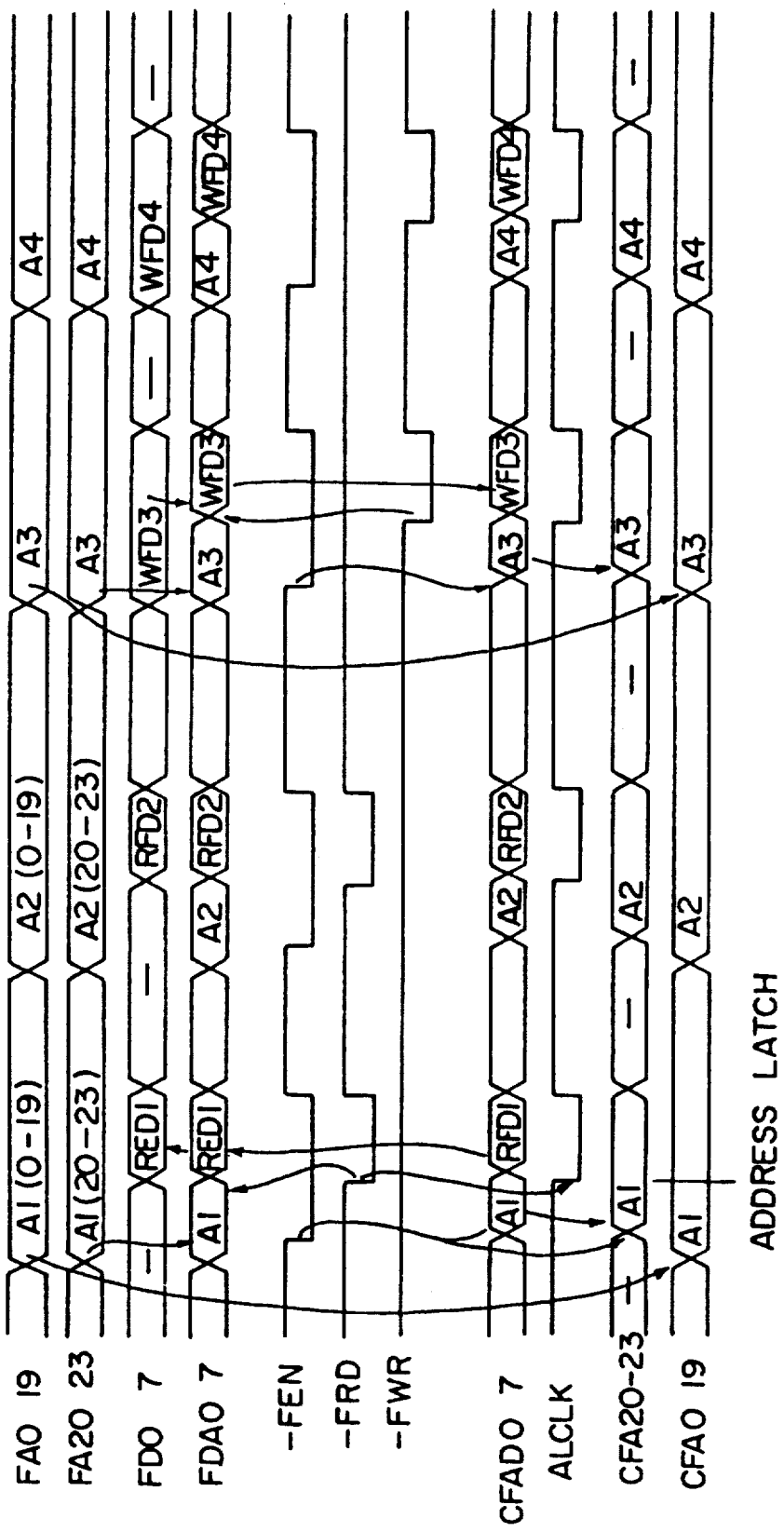
FIG. 2 is a time chart showing an operational state of the circuit of FIG. 1.

The font data processing portion 4 receives and delivers data signals FD0 to FD7 as well as delivers a control signal -FEN for indicating the access of the font cartridge 2, a control signal -FRD for reading the font data in the font cartridge 2 and a control signal -FWR for writing the font data as shown in FIG. 2.

The data signals FD0 to FD7 are applied to address data signal lines FAD0 to FAD7 (the data line 19) via a bus transceiver 7. Accordingly, on the address data signal lines FAD0 to FAD3 which are the 4 low-order bits of the address data signal lines FAD0 to FAD7 are the address signals from the bus bus buffer 6 and the data signals from the bus transceiver 7, both signals being overlapped in timewise fashion as described later.

The control signals -FEN, -FRD and -FWR are delivered via a bus buffer 8 to output signal lines 20, 21 and 22 respectively while controlling the bus buffer 6 and bus transceiver 7 via logic elements 9, 10 and 11. Specifically, the bus buffer 6 is in an operating condition when both control signals -FRD and -FWR are inactive, whereas it is in a high impedance condition when either control signals -FRD or -FWR is active. The bus transceiver 7 is in the operating condition when at least one of the control signals -FRD and -FWR is active together with the active state of the control signal -FEN, while otherwise, it is in the high impedance condition as well as is selected the direction of communication based on the state of the cotnrol signal -FRD.

The font cartridge 2 includes a font memory 12 comprising a font ROM (which is the abbreviation of read only memory), or alternatively comprising a font ROM and RAM (which is the abbreviation of a random access memory). Fed to the font memory 12 are the address signals FA0 to FA19 via a bus buffer 13 from address signal lines CFA0 to CFA19, said signals FA0 to FA19 being supplied from the address line 18, whereas the signals from the address data signal lines FAD0 to FAD7 are fed to and delivered from the font memory 12 through the address data signal lines CFAD0 to CFAD7 via a bus transceiver 14. On the other hand, the control signals -FRD and -FWR from the output signal lines 20 to 22 are inputted to the font memory 12 through control signal lines -CFRD and -CFWR via a bus buffer 15. The address data signal lines CFAD0 to CFAD3 which are 4 low-order bits of the address data signal lines CFAD0 to CFAD7 from the bus transceiver 14 are fed to a latch circuit 16 to be latched by a latch signal ALCLK generated from the logic element 17, and then be fed to the font memory 12 through the address signal lines CFA20 to CFA23. The bus transceiver 14 is in the operating condition when the control signal -CFEN is active. The direction of communication of the bus transceiver 14 is determined based on the state of the control signal -FRD.

FIG. 2 is a time chart showing the operational timing of the circuit represented by the block diagram in FIG. 1. In FIG. 2, two cycles in the left side illustrates a cycle for reading the font data, while two cycles in the right side in FIG. 2 for writing the font data.

Explained first is the cycle for reading the font data. When a font address A1 is generated from the font address generating portion 3 with all the control signals -FEN, -FRD and -FWR inactive, the address signals FA0 to FA19 which are 20 low-order bits in the font address A1 are fed to the font memory 12 through the address signal lines CFA0 to CFA19 via the bus buffers 5 and 13. The address signals FA20 to FA23 of 4 high-order bits in the font address A1 are applied to the address data signal lines FAD0 to FAD3 (the data line 19). Thereafter, these signals are fed to the latch circuit 16 through the address data signal lines CFAD0 to CFAD3, and then to the font memory 12 through the address signal lines CFA20 to CFA23 when the control signal -FEN is in an active state (i.e., in "L" state).

Upon the active state of the control signal -FRD (i.e., the "L" state), the latch circuit 16 latches the address signals FA20 to FA23 on the address signal lines CFA20 to CFA23 to keep on delivering the address signals FA20 to FA23 to the font memory 12 until the control signal -FRD is again in "H" state.

On the other hand, a data RFD1 which should be read out from the font memory 12 by the designation of the address A1 through the address signal lines CFA0 to CFA23 is fed to the address data signal lines CFAD0 to CFAD7 at a timing when the control signals -FEN and -FRD are active ("L"). Thereafter, the data RFD1 is fed to the font data processing portion 4 as data signals FD0 to FD7 through the bus transceivers 14 and 7. At the same time, the bus buffer 6 is in the high impedance condition, stopping the output of the address signals to the address data signal lines FAD0 to FAD3.

Subsequently, the cycle for writing is explained. This cycle is almost the same as the cycle for reading except that the control signal -FRD for the reading cycle is altered to the control signal -FWR and the direction of communication of the bus transceivers 7 and 14 is reversed so as to direct the data signals to the font memory 12 from the font data proccessing portion 4.

According to the aforesaid embodiment, the address signals FA20 to FA23 which are 4 high-order bits in the address A1 from the font address generating portion 3 and the data signals FD0 to FD3 which are 4 low-order bits of the data RFD1 read from the font memory 12 are delivered as periodically overlapped in timewise fashion (multiplex transmission) in each one cycle of reading or writing. The address signals FA20 to FA23 of 4 high-order bits in the address A1 are transmitted through the data line 19 (the address data signal lines FAD0 to FAD3) for a data signal and latched by the latch circuit 16, constituting 24-bit address by joining the address signal lines CFA0 to CFA19. Accordingly, the address A1 with 24 bits can be designated even though the address line 18 for address signals has only the number corresponding to 20 low-order bits in the address A1.

Consequently, the conventional type of machines having address signal lines with 20 bits can be provided with the font cartridge 2 including the font memory 12 which can designate the address A1 with 24 bits. Further, the latch 16 may be omitted if the font memory 12 has a memory capacity not so great and an address can be designated with less than 20 bits, resulting in that replaceability can be maintained regardless of the latch 16. This eliminates the disadvantage that there is no replaceability between machines of conventional type and those of new type due to the increased number of bits for addressing of the memory. Therefore, an address can easily be increased with replaceability.

Although the address signals are partly overlapped with the data signals in the aforesaid embodiment, it is possible to overlap the address signals with any other signals. Moreover, a decision may be made as to which bit is overlapped in the address signals at the time of designing the circuit. Similarly, specific construction of each logic element and connecting line as well as the timing of each signal may be determined when the circuit is designed.

Although the present invention is explained using a font cartridge of a laser printer, the present invention can be applicable to font cartridges of other printers and display devices, as well as memory units of various types of business equipment and industrial equipment having a computer capacity.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a computing system having a detachable memory unit for connection to a main body having a computing processor that can control various operations of the main body, the computing processor having a limited number of signal communication ports available for interconnection with a detachable memory unit, the improvement comprising:

memory means, provided in the detachable memory unit, for storing data that can be addressed;

a first communication line connected between one signal communicating port of the processor and an addressing port of the memory means;

a second communication line connected between another signal communicating port of the processor and a data communicating port of the memory means;

means for enabling the computing processor to generate an address of a plural number of bits for application to the memory unit and for dividing the generated address bits into two separate portions of bits;

means for loading one portion of address bits on the first communication lien and another portion of address bits on the second communication line;

means, provided in the detachable memory unit, for receiving and combining two separate portions of address bits from respectively the first and second communication lines to form a complete address for application to the memory means, and means for providing a multiplex transmission of data and address bits on the second communication line.

2. In a computing system having a detachable memory unit for connection to a main body having a computing processor that can control various operations of the main body, the computing processor having a limited number of signal communication ports available for interconnection with a detachable memory unit, the improvement comprising:

memory means, provided in the detachable memory unit, for storing data that can be addressed;

a first communication lien connected between a first signal communicating port of the processor and an addressing port of the memory means, the first signal communicating port being dedicated to addressing the memory means;

a second communication line connected between a second signal communicating port of the processor and a data communicating port of the memory means, the second signal communicating port being originally connected to the computing system to receive only data;

means for enabling the computing processor to generate an address of a plural number of bits for application to the memory unit and for dividing the generated address bits into two separate portions of bits, the first communication line having a smaller number of connectors than the number of bits of the address;

means for loading one portion of address bits on the first communication lien within the capacity of its connectors and loading the remaining portion of the address bits on the second communication line;

means, provided int he detachable memory unit, for receiving and combining two separate portions of address bits from respectively the first and second communication lines to form a complete address for application to the memory means, and means for providing a multiplex transmission of data and address bits only on the second communication line.

* * * * *